Inventor:
Rolf Seybold

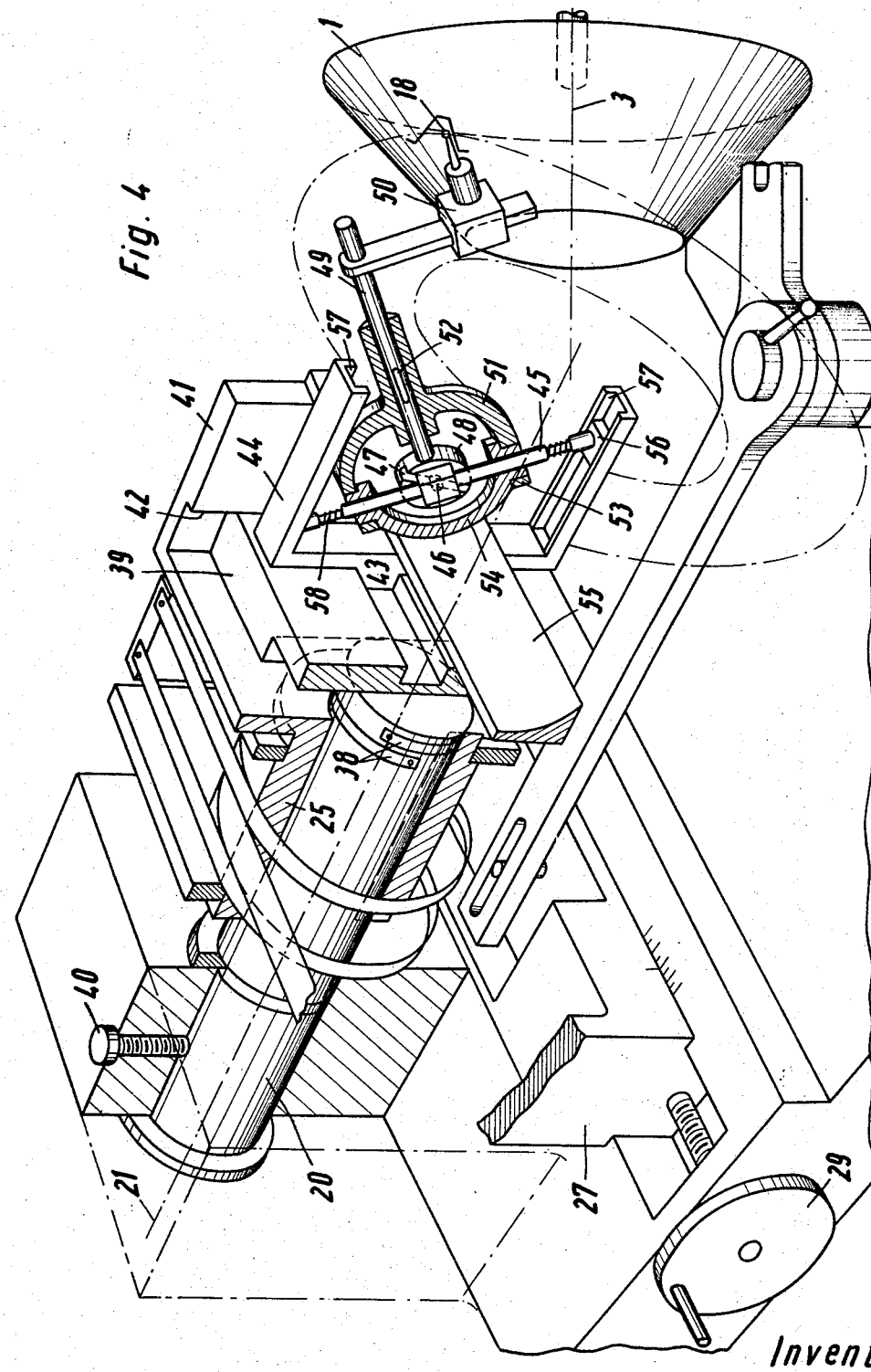

United States Patent Office 3,521,368
Patented July 21, 1970

3,521,368
APPARATUS FOR CHECKING THE FLANKS OF
GEARS, ESPECIALLY BEVEL GEARS
Rolf Seybold, Solingen, Germany, assignor to W. Ferd.
Klingelnberg Sohne, Berghausen, Germany
Filed June 21, 1968, Ser. No. 738,986
Claims priority, application Germany, June 24, 1967,
K 62,636
Int. Cl. G01b 5/20
U.S. Cl. 33—179.5                        16 Claims

ABSTRACT OF THE DISCLOSURE

Apparatus for checking the tooth profiles of gears comprising; a support for the gear to be checked and a support for a feeler and a base common to said supports, said supports being adjustable angularly about an axis vertical to the base, each support comprising a carriage. A lever pivoted on the aforementioned axis interconnects the carriages for simultaneous movement. Movement of the carriage pertaining to the gear support causes rotation of the gear to be checked that is mounted thereon. Movement of the carriage pertaining to the support for the feeler causes rotation of the feeler. The supports are adjustable relatively to accommodate for different types and sizes of gears and the feeler is adjustable on its support during rotation of the gear being checked and the feeler, the feeler follows the profile of a tooth of the gear.

The present invention relates to an apparatus for checking the flanks of bevel gears, which apparatus, if desired may also be used for checking spur gears.

It is an object of this invention to provide an apparatus which with accuracy and without great skill will make it possible to adjust the device in a short time for checking the respective gear and carrying out the desired measuring operation.

It is another object of this invention to provide an apparatus as set forth in the preceding paragraph which will be suitable for ascertaining deviations of the flank profile from the ball involute by means of a point-shaped measuring feeler, and also for ascertaining the deviations from the profile of the octoid gearing while employing an edge-shaped or point-shaped measuring feeler.

It is still another object of this invention to provide an apparatus of the above mentioned type which due to its structure will make possible the employment of auxiliary devices for checking the flank lines of various forms such as straight lines, arcs, involutes and cycloids.

These and other objects and advantages of the invention will appear more clearly from the following specification in connection with the accompanying drawings, in which:

FIG. 4 is an isometric view of an apparatus similar to that of FIG. 1, in which the feeler mechanism likewise carries out a turning movement in conformity with the reference gearing while the feeler head is additionally displaced in the direction of the height of the teeth.

The apparatus according to the present invention is equipped with two roller bodies of which one is associated with a feeling mechanism whereas the other one is associated with a workpiece to be checked, said two rolling bodies being interconnected through roller bands and rulers for mutual transfer of movements. Heretofore, known apparatuses of the type involved are not as simple in the handling of the adjusting elements and as safe as is desirable for devices of the type involved. Furthermore, heretofore known devices of the type referred to above are not usable as universally as a device according to the present invention.

In conformity with the present invention, the rolling cylinder associated with the feeling mechanism is arranged on a stationary journalled shaft and cooperates with a carriage which is displaceable transverse to the shaft axis while the feeler mechanism is directly or indirectly arranged on the stationary journalled shaft, the rolling cylinder or the transverse carriage. The workpiece to be checked which likewise has associated therewith a rolling cylinder with rolling bands and a carriage displaceable in transverse direction is mounted on a pivotable carriage. The pivot axis of the last mentioned carriage and the axis of the shaft associated with the feeling mechanism intersect with non-axis offset workpieces in the tip of the cone thereof.

Advantageously, the two transverse carriages are coupled to each other through the intervention of an angle lever which is movable about the axis of the pivotable carriage, the angle between the two lever arms being adjustable in conformity with the angle of the cone of the workpiece to be checked.

When transferring the movement from one transverse carriage to the other, the transmission ratio can be taken into consideration by the provision of a follower on the lever, which follower is displaceable in the direction of the axis of the workpiece to be checked.

For producing additional movements, for instance in order to feel the flank profiles in different sections, the shaft which is associated with the feeling mechanism may, in addition to the rolling drive cooperating with the transverse carriage, also be equipped with an additional rolling drive for transmission. The shaft is secured against turning, whereas the rolling cylinder is freely rotatable thereon.

Figure 1:
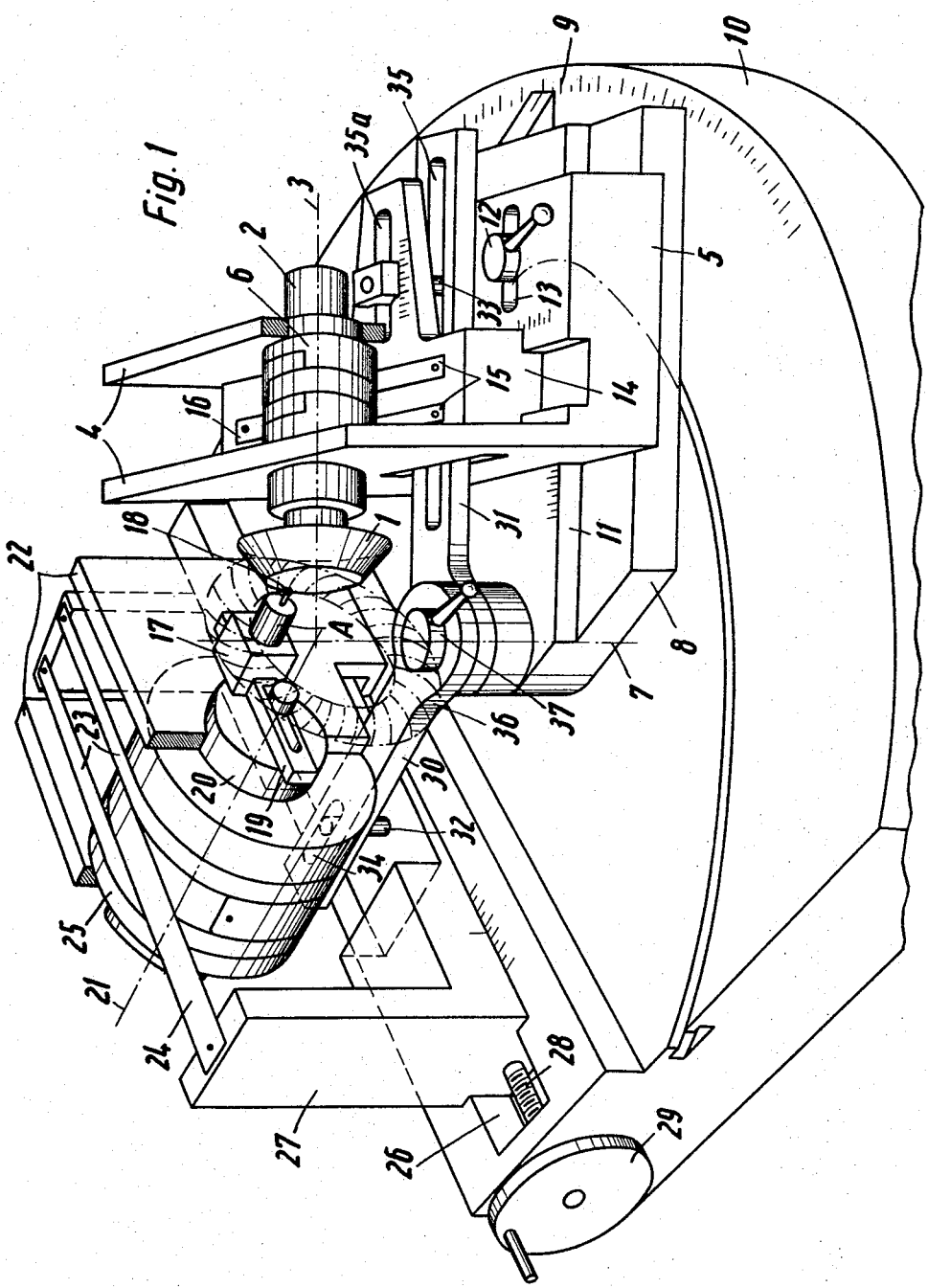
FIG. 1 is an isometric illustration of a device according to the present invention with a feeler mechanism adapted to carry out a turning movement in conformity with an imaginary reference gearing associated with a workpiece to be checked.

Referring now to the drawings in detail, FIG. 1 shows the workpiece 1 to be tested on a spindle 2 which is journalled for rotation about an axis 3 on beams 4 of a carriage 5. A rolling cylinder 6 is mounted on spindle 2 and is coupled thereto for rotation therewith. The carriage 5 is supported by a support 8 which is pivotable about an axis 7 and is adapted in conformity with a scale 9 on bed 10 of the device to be adjusted according to the conical angle or bevel of the workpiece to be checked. The carriage 5 is adapted to be displaced on guiding means 11 on support 8 in the direction of the axis of the workpiece to be checked in such a manner, and by means of a clamping screw 12, extending through a slot 13 can be so connected thereto that the tip of the cone of the workpiece to be checked will be located on the pivot axis if the gears are involved which are not offset with regard to the axis.

The carriage 5 supports a carriage 14 which is movable transverse to the axis of the workpiece to be checked.

Connected to said carriage 14 are the ends of rolling bands or strips 15 and 16 which are looped around the rolling cylinder 6 as is customary with rolling band transmissions.

A feeler mechanism 17 which has a feeler dome 18 and by means of the latter is passed along the flank of the workpiece to be checked and the deviations of which are in a manner known per se, by means of a non-illustrated electronic diagram writing instrument or graph recorded on an enlarged scale is in this instance connected to a radially displaceable cantilever 19 on a shaft 20. Shaft 20 in its turn is rotatable about its axis 21 in cantilever beams 22 of the bed 10. A rolling cylinder 25 is mounted on said shaft 20 and can be coupled thereto for rotation therewith, said rolling cylinder 25 having looped therearound in customary manner roller bands 23 and 24. The ends of the roller bands are connected to a carriage 27 which is displaceable on a guiding path 26 of bed 10 in a direction transverse to the shaft 20. This carriage 27 is displaced by a threaded spindle 28 which is adapted to be actuated by a hand wheel 29.

For purposes of transferring the movement of the transverse carriage 27 to the transverse carriage 14 there is provided an angle lever with the arms 30 and 31. The axis of this lever coincides with pivot axis 7 of the support 8. The transverse carriage 8 is connected to the arm 30 of the angle lever through the interchange of a follower stud 32, whereas the transverse carriage 14 is connected to the arm 31 through the intervention of a follower 33. The said stud 32 and follower 33 are guided in oblong openings 34 and 35 respectively. As will be evident from FIG. 1, the follower 33 is additionally displaceable in a slot 35a of the transverse carriage 14 in order to be able to adapt the transfer of the movement to the ratio of the number of teeth of the workpiece 1 to be checked and also in order to adapt the transfer movement to its ideal reference gearing 36 while taking into consideration the diameter ratio of the rolling cylinders.

The arms 30 and 31 are held fast in their respective angle position by means of a clamping screw 37. When the clamping screws 12 and 37 are released, the support 8 may be adjusted in conformity with the scale 9 on the angle of the divisional cone of the workpiece to be tested. In such an instance, if previously the carriages 14 and 27 have been moved to the central position in which the lever arms 30 and 31 are parallel to the axis 3 and 21 of the rolling cylinders 6 and 25, the arms of the angle lever will occupy the proper angular position. The operation of the device is as follows:

OPERATION OF THE APPARATUS ACCORDING TO FIG. 1

The operation of the apparatus is as follows: The turning of the hand crank 29 brings about a displacement of the transverse carriage 27 and thereby through the intervention of the roller bands brings about a rotation of the roller cylinder 25 and the shaft 20 coupled thereto. Consequently, also the feeler dome 18 of the feeler mechanism rotates about the axis 21. It moves with the imaginary reference gearing and more specifically at the previously adjusted distance from the axis. Through the intervention of the angle levers 30, 31, simultaneously with the transverse carriage 27 also the transverse carriage 14 is displaced, whereby the roller cylinder 6 and also the workpiece 1 to be tested carries out a rotation in conformity with its engagement with the reference gearing.

If it is intended to measure the deviations of the profile from a ball involute, the support 8 is so adjusted with regard to the base cone angle $\delta_g$ of the ball involute and the transmission ratio is, through the roller band transmissions and the effective length of the lever arm 31 so adjusted as if the base cone rolls on a plane perpendicular to the axis 21.

Figure 2:
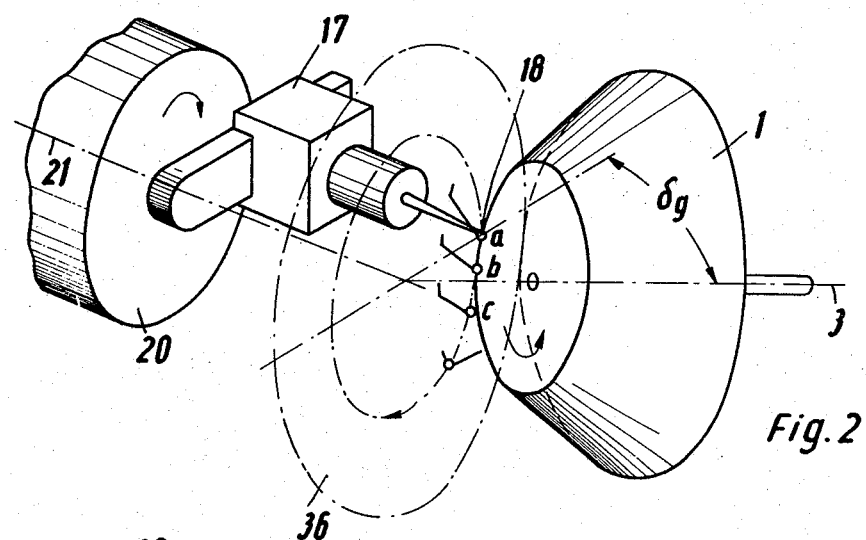
FIG. 2 illustrates positions of the feeler head during the feeling of the tooth profile with a point feeler.

FIG. 2 shows a number of positions, a, b, and c of the feeler dome 18 when point-wise feeling the gear profile which is illustrated as reaching to the base cone. The inserted reference numerals correspond to those of FIG. 1.

Figure 3:
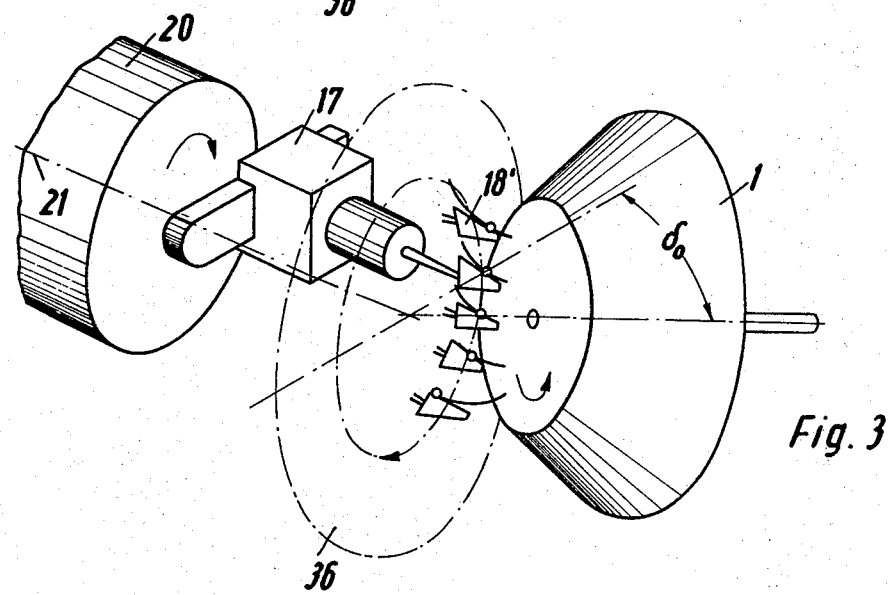
FIG. 3 shows a plurality of positions of the feeler head when feeling the tooth profile with an edge-shaped feeler.

Similar remarks apply to FIG. 3, according to which an edge-shaped feeler 18' is employed for feeling the profile. The measuring edge of said feeler 18' corresponds to the cutting edge of the producing tool, which means to the straight flank profile of the reference plane wheel of the octoidal gearing. In this instance, the transmission ratio has to be so adjusted as if the pitch cone with the angle $\delta_0$ of the gear to be checked rolls on a plane perpendicular to the axis 21, said plane forming the pitch plane of the reference plane wheel.

It may be mentioned that the profile of the octoidal gearing can also be measured with a point contacting feeler as if a ball involute were involved, i.e. with a correspondingly adjusted transmission ratio, and the differences occurring in the check picture between said ball involute and the profile of the octoidal gearing can be taken into consideration. This procedure, however, is awkward because in this instance the theoretical profile of the octoidal gearing has to be first calculated and a corresponding diagram has to be drawn up. The measurement with the edge feeler has the drawback that the latter, due to its tangential contact with the profile, especially when the profile is rather undulated, has some difficulty to follow said profile and thus makes it appear smoother than it actually is. Furthermore, when measuring with the edge feeler it is difficult to pin down certain points of the flank profile in the diagram.

Therefore it is considerably more favorable to employ a point-shaped feeler and to move the same during the measuring operation additionally in the direction of the height of the tooth so that in its path it will act like a measuring edge. Such operation is possible with the design according to FIG. 4.

Fundamentally, the device according to FIG. 4 corresponds to that of FIG. 1. The arrangement of FIG. 4, however, comprises the following additional elements. The shaft 20 associated with the feeler mechanism is, in addition to the described roller transmission 23–25 cooperating with the transverse carriage 27, additionally equipped with a further roller transmission, namely, shaft 20, roller bands 38 and carriage 39. Shaft 20 is, by means of a set screw 40 secured against rotation, whereas the roller cylinder 25 is freely rotatable on the shaft 20. Fixedly connected to the roller cylinder is an angle member 41 with machined-in guiding groove 42 for the carriage 39. This carriage 39 has connected thereto the ends of the roller bands 38. The carriage 39 supports a substantially U-shaped member 44 which is radially adjustable in the guiding groove 43. Between the legs of U-shaped member 44 there is rotatably journalled a shaft 45. Shaft 45 is adjustably inclined by the meshing angle of the workpiece to be checked with regard to a plane perpendicular to the axis 21. Shaft 45 has its central portion provided with a stud or pin 46 which is guided in a groove 47 of a cylindrical disc 48. Connected to disc 48 is a rod 49 with the feeler 50, said rod 49 is being guided in the neck of a rocker 51 and is secured by a key 52 against rotation. The inclined position of groove 47 is adjustable in conformity with the respective prevailing conditions. The rocker 51 is journalled in bearings 53 on a base member 54 which is adjustably connected on a guiding body 55 by non-illustrated means. The said guiding body 55 is connected to the legs of the angle member 41.

The ends of the shaft 45 are journalled in ball cups of sliding shoes 56 which are adapted to be displaced in guiding grooves 57 in the legs of the member 44. Shaft 45 consists of three telescopically interengaging members which are pressed apart by springs 58. When pivoting the rocker 51 about the axis of the stud 46, the slide shoes 56 slide in the guiding grooves 57, and the sections of the shaft 45 move into or out of each other. In the adjusted pivoting positions about the axes of members 46 and 53, the rocker is adapted to be clamped fast by any convenient means not shown in FIG. 4.

OPERATION OF THE DEVICE ACCORDING TO FIG. 4

The operation of the device of FIG. 4 is as follows: The U-shaped member 44 arranged on the carriage 39 is radially adjusted with regard to the axis 21 in such a manner that the feeler dome 18 rakes the profile of the workpiece to be checked at the predetermined distance from its pitch cone tip when by turning the hand crank 29 the imaginary reference gearing and the workpiece to be checked roll upon each other. So far, the movements correspond to those of the device according to FIG. 1. According to FIG. 4 there is an additional movement of the feeler head in the direction of the height of the tooth. If, namely, the angle member 41 together with the roller cylinder 25 turns about the axis 21 and the carriage 39 follows this movement, said carriage 39 simultaneously moves in groove 42 due to the rolling on the stationarily held shaft 20 as forced by the roller bands 38. The member 44 is thus moved along. Shaft 45, stud 46 and inclined guiding means 47 bring about an axial displacement of the rod 49 and thereby the desired additional movement of the feeling device 50 with the feeler dome 18 in the direction of the height of the tooth.

Due to the tiltability of the rocker 51 about two axes arranged perpendicularly to each other, the rod 49 can, within certain limits, be adjusted in conformity with any desired direction relative to axis 21. In this way it will be possible to move the feeler in conformity with the rectilinear profile of the tangential sections of the reference gearing bevel gears with straight or inclined teeth and also in conformity with the rectilinear profile of the normal section of the reference gearing of bevel gears with spiral teeth. Inasmuch as the measuring feeler which moves along a straight path in both instances represents a profile of the reference gearing, the transmission ratio for the turning movements of the reference gearing and of the workpiece to be checked, i.e. of the rolling cylinder 25 and the spindle 2 is to be adjusted in conformity with the pitch cone angle of the workpiece to be checked.

If desired, in view of the adjusting possibilities, the rod 49 carrying the measuring feeler may also be adjusted in the direction of the rectilinear normal profile section of a non-rolled spur bevel gear with spiral teeth. In order then to check the flank profile of the teeth of a gear associated with said spur bevel gear, it is necessary to adjust the transmission ratio of the rolling cylinder 25 and the receiving spindle 2 in conformity with the teeth ratio of the workpiece to be checked to the spur bevel gear while the angle of the axes 3 and 21 must equal the axis angle of the transmission.

The apparatus according to the invention with devices according to FIGS. 6–9 is likewise adapted to check the proper course of the longitudinal lines of flanks, henceforth called flank lines, of straight and inclined teeth bevel gears and of spindle bevel gears with curved teeth having involutes extended along circles or with extended cycloids.

Figure 5:
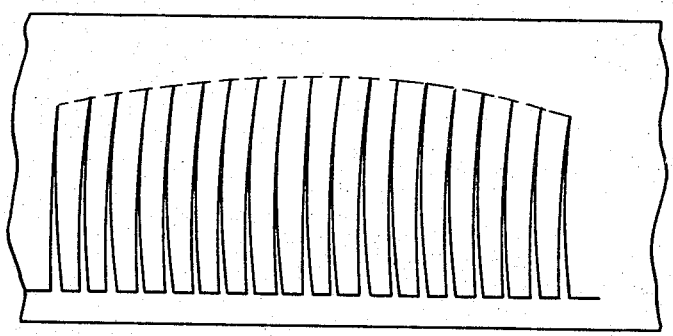
FIG. 5 is a diagram of a flank line check up with a measuring device according to FIG. 6.
Figure 6:
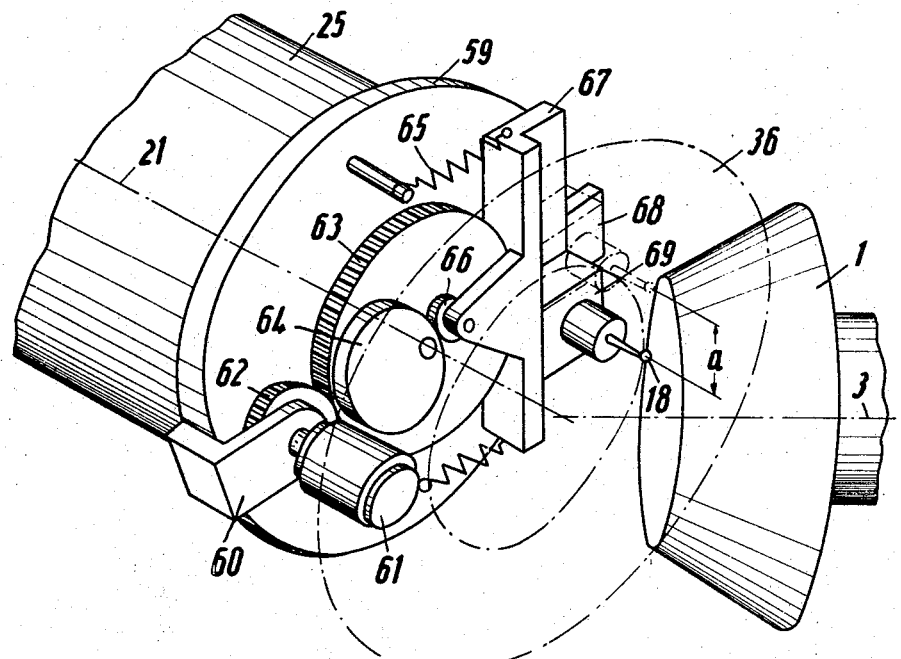
FIG. 6 shows an arrangement for checking the flank lines on straight teeth and inclined teeth bevel gears.

Since all flank lines of straight teeth bevel gears are directed to the pitch cone tip, the checking of the course of said flank lines is possible with only one straight line guiding means for the feeler extending in said direction. With inclined teeth bevel gears, the flank lines in the pitch plane of the reference gearing is tangential to a circle around the center point of said reference gearing. The flank lines on the pitch course of the gears are obtained by the winding up of the straight flank lines of the reference gearing upon the pitch cone, in other words, they are spacely curved. If the pitch cone of the gear is permitted to roll on the pitch plane of the reference gearing, and if simultaneously a feeler with point contact is caused to perform a reciprocal movement which is relatively fast to the unrolling of the workpiece to be checked, and if this reciprocatory movement is effected in the direction of the flank lines of the reference gearing, it will be appreciated that the feeler, during the rolling operation of the workpiece to be checked, the flanks always contact at the points of its pitch cone where the flank lines of the reference gearing in the respective rolling position contact with the points of the gear. The diagram obtained by the writing instrument recording the deviations of the feeler thus consists in a greater number of individual deviations the maximum values of which represent a measuring point. The connecting line through the tips of the deviations represents the picture of the flank line. The latter is not free from errors when all of the tips are located at the same level, i.e. when the connecting line is straight and is parallel (FIG. 5) to the said direction of the diagram strip. The arrangement for carrying out this measuring operation is illustrated in FIG. 6.

The rolling cylinder 25 of FIG. 4 is provided with a flange 59 having connected thereto an angle member 60. This angle member 60 serves as bearing for a small motor 61 which drives a friction roller 62 connected to the motor shaft. The friction roller drives a friction disc 63 rotatably journalled on flange 59. Radially adjustably connected to said friction disc 63 is an eccentric disc 64. The eccentric disc is, due to the pull of springs 65, engaged by a roller 66 which is journalled on a carriage 67. The carriage 67 is guided in radial direction on a guiding path 68 on flange 59. Connected to said flange is a measuring head 69 with measuring feeler 18, said measuring head being adjustable perpendicularly with regard to the guiding path 68.

For purposes of checking the flank lines of straight teeth bevel gears, the measuring feeler 69 is so adjusted with regard to the carriage 67 that during the displacement of the carriage which moves on a radial path perpendicularly to the axis 21. The rolling cylinder 25 is stationary and the motor 61 rotates at low speed. The roller 66 engaging the eccentric disc 64 and the springs 65 slowly move the carriage 67 back and forth. The measuring feeler engaging a tooth flank of the likewise non-movable workpiece to be checked receives the deviation of the flank line from its straight radial course.

For purposes of checking the flank lines of inclined teeth bevel gears, the measuring feeler 69 is adjusted relative to the carriage 67 so that its path contacts the circle in the pitch plane of the reference gearing which determines the inclination of the teeth of the workpiece to be checked which means that it passes the axis 21 at a distance equaling the radius $a$ of said circle. Workpiece 1 to be checked and rolling cylinder 25 are driven in conformity with the transmission ratio of the number of gears of the reference gearing and of the workpiece to be checked as has been described above in connection with FIG. 1. At the same time the motor 61, which in this instance operates at high speed, brings about a reciprocatory movement of carriage 67 and thus drives a measuring feeler at a stroke speed which is relatively high to the rolling movement so that in the above described manner a measuring diagram is obtained in conformity with FIG. 5.

Figure 8:
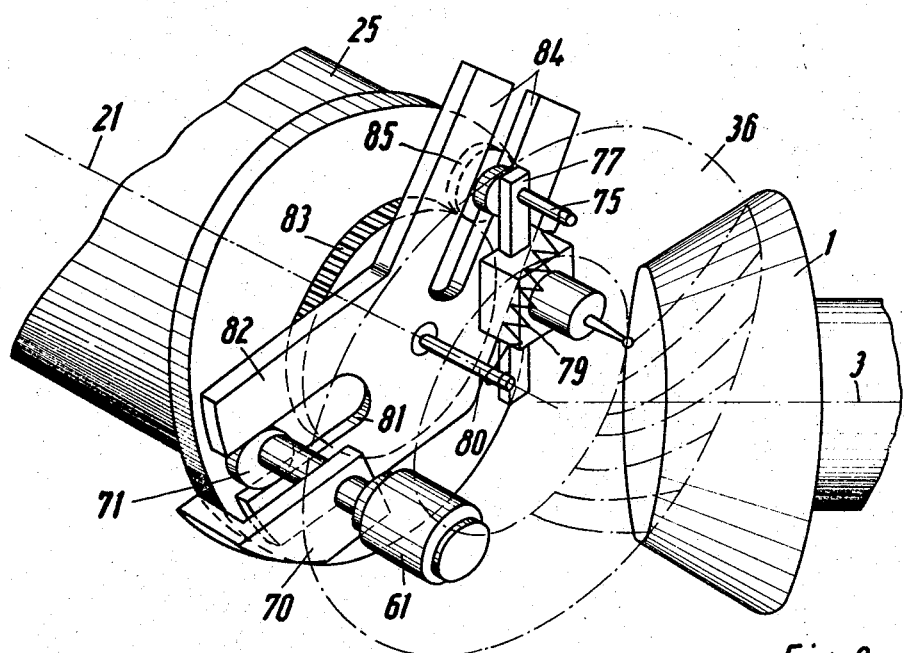
FIG. 8 illustrates an arrangement for checking cycloidal flank lines.
Figure 9:
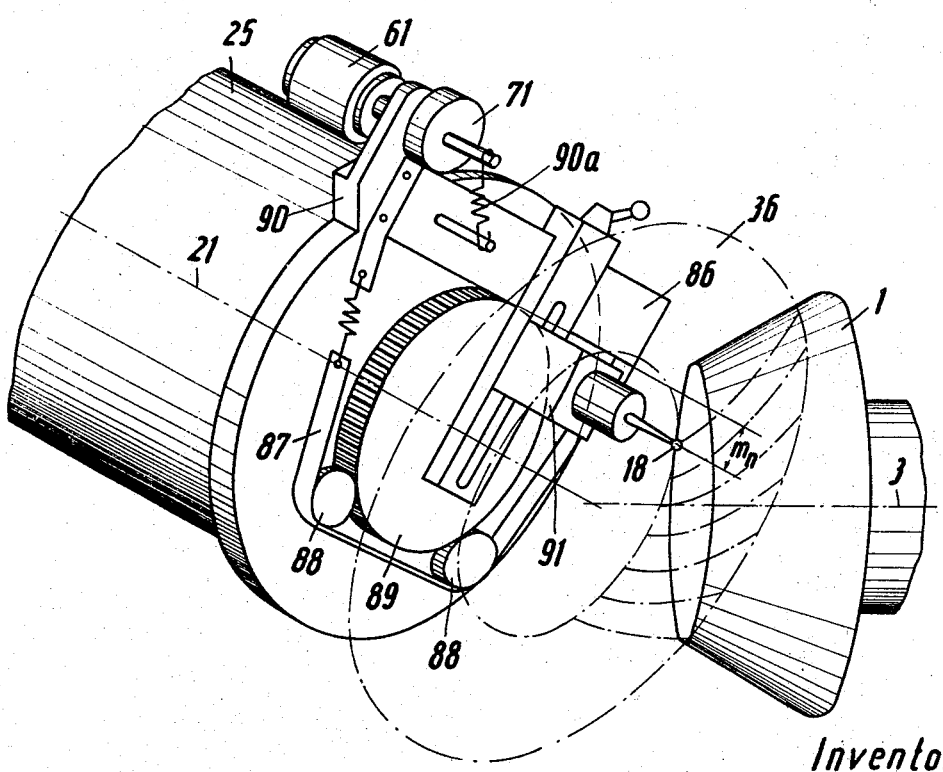
FIG. 9 illustrates an arrangement for testing involute-shaped flank lines.

Correspondingly, the flank lines of spiral bevel gears may be checked if care is taken that the measuring feeler is guided by a corresponding guiding means on the rated flank line of the reference gearing, for instance along a circular arc, and extend involute or epicycloid and if along the same there is effected a stroke movement which is relatively fast with regard to the rolling of the workpiece to be checked. Corresponding measuring arrangements are shown in FIGS. 7 to 9.

Figure 7:
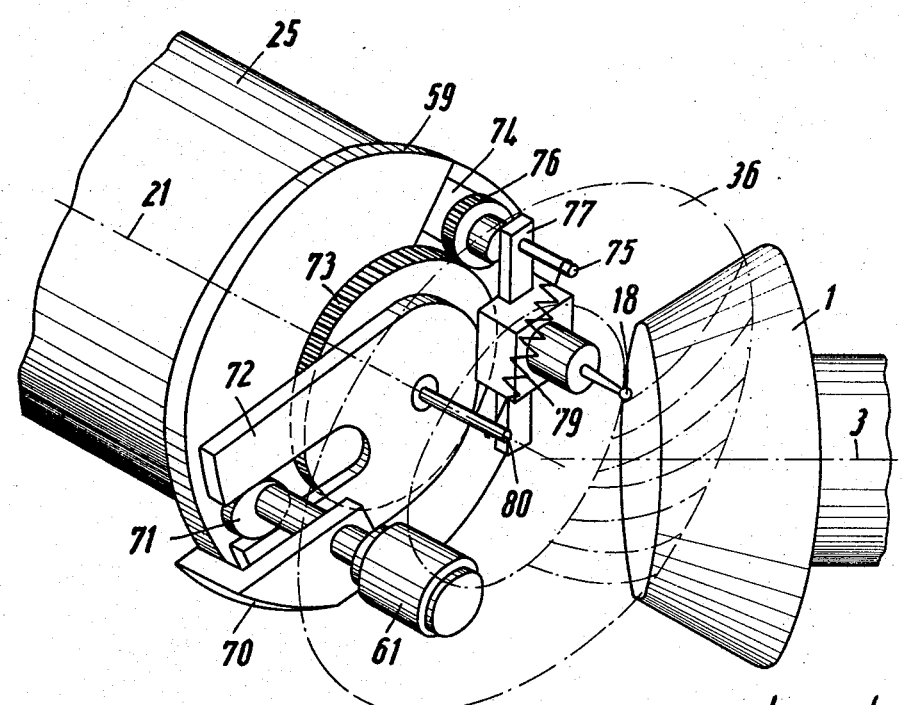
FIG. 7 represents an arrangement for checking arched flank lines.

According to the arrangement of FIG. 7 which serves for checking arched flank lines, the motor 61 mounted on a flange 59 by means of an angle piece drives an eccentric disc 71 connected to the motor shaft. Said eccentric disc engages a slot of a link 72 which is connected with a rolling disc 73 rotatably journalled on flange 59. Radially adjustable in a guiding path of a flange 59 is a sliding member 74 with a bearing bolt 75 having rotatably journalled thereon a friction roller 76. Connected to said roller 76 is an arm 77 which carries a measuring head 78 adjustable thereon. A spring 79 engaging the bearing bolt 75 and a bolt 80 fixed to flange 59 pulls the friction roller 76 against the rolling disc 73.

OPERATION OF THE DEVICE OF FIG. 7

The arrangement of FIG. 7 operates as follows: When the workpiece 1 to be checked, and the roller cylinder 25 are driven at the transmission ratio of the number of teeth of the reference gearing to the number of the teeth of the workpiece to be checked, the drive by the fast running motor 61 will through the eccentric disc and the rolling disc bring about an oscillation of the feeler 18 engaging the flank of the workpiece to be checked along a circular path about the axis of bolt 75. If the distance of the axis of bolt 75 from the axis 21 and if the radial distance of the feeler 18 from the axis of the bolt 75 has been adjusted in conformity with the values applying to the respective reference gearing, the feeler will, on the rated flank line of the reference gearing, oscillate back and forth and will, during the rolling off of the workpiece to be checked on the pitch plane in the manner described above for the inclined teeth bevel gears at the reversing points of its movement, record the course of the flank lines of the workpiece to be checked. For purposes of adjusting the distance of the axis of the bolt 75 with regard to the axis 21, the rolling disc 73 is exchangeable.

According to the measuring arrangement of FIG. 8, the extended epicycloid is after its law of generation while a circle (rolling circle) rolls on a second fixed circle (base circle) described by a point which carries out a rotation of the rolled circle, but moves on a circle having a greater radius than that of the rolling circle.

The small electric motor 61 which, by means of an angled member 70, is connected to the flange 59 of the rolling cylinder 25 drives the eccentric disc 71 which engages a slot 81 of a two-arm lever 82 which is freely rotatably journalled on the rolling cylinder 25. Non-rotatably centrally connected to the flange of the rolling cylinder is a base circle disc 83. In a second slot 84 of the two-arm lever 82, a rolling circle disc 85 is radially adjustable with regard to the axis 21. The measuring head with the measuring feeler 18 is connected to the rolling circle disc by the same means as referred to in connection with FIG. 7.

During the checking operation, the rolling cylinder 25 and the workpiece to be checked are again driven at the said transmission ratio. The electric motor imparts an oscillating movement to the lever 82 through the intervention of the eccentric disc 71. As a result thereof, the disc 85 rolls on the base circle disc 83 which is stationary relative to roller cylinder 25, and the feeler 18 when correspondingly spaced from the axis of bolt 75 describes the extended epicycloid of the base circle disc 83 in the partial plane of the reference gearing 36 which rotates with the roller cylinder. The disc 83 and the disc 85 are exchangeably arranged inasmuch as their diameters have to correspond, of course, to the rated diameter of the base circle and roller circle of the extended epicycloid to be checked. Each point on the edge of a ruler which rolls on a fixed circle, the base circle describes a circle involute. An extended (circle) involute is described by each point connected to the ruler which seen from the rolling ruler edge is displaced by a certain distance toward the interior of the base circle. With spiral bevel gears produced with a conical cutter having a 60° cone angle, the flank lines in the pitch plane of the reference gearing have the form of elongated involutes with the base circle $$= \rho \frac{m_n \cdot z_p}{2}$$

and the generating point is displaced toward the interior of the base circle by the distance $a = m_n$.

With the measuring arrangement according to FIG. 9, a ruler 86 is, by means of a roller band 87 through the intervention of intermediate rollers 88, pressed against a roller disc 89 which is exchangeably connected to a flange 59 of the roller cylinder 25. A small electric motor 61 with an eccentric disc 71 is mounted on a support 90 connected to a flange. A spring 90a continuously urges the ruler 86 against the eccentric disc, which latter imparts to the ruler a rocking movement about the roller disc 89. The feeler dome 18 on the feeler head 91 which is connected to the ruler with an adjustable distance from the ruler edge, describes while oscillating back and forth the desired involute-shaped path. The roller disc has to have the base circle diameter of the reference gearing, and the feeler has to be adjusted for the distance $m_n$ from the ruler edge.

Figure 10:
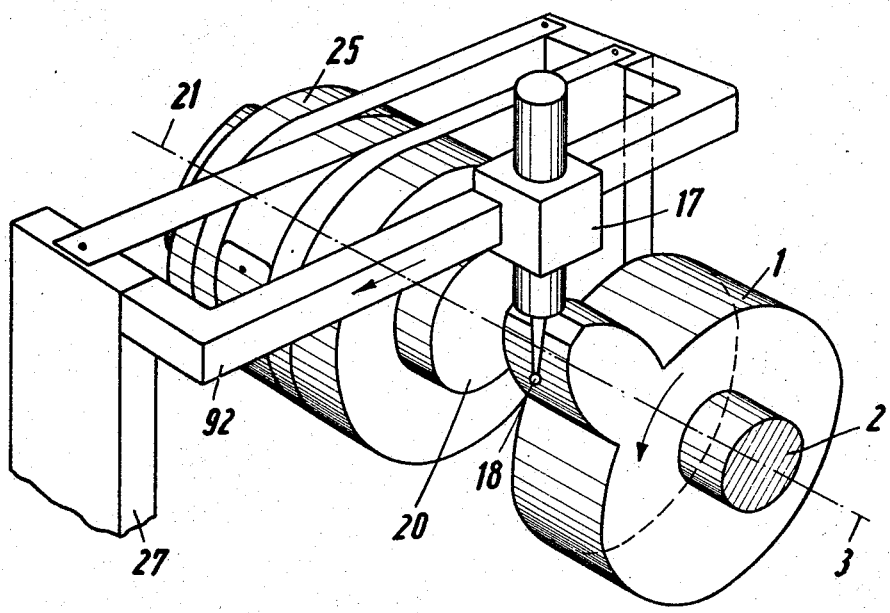
FIG. 10 shows the principle of profile checking according to the invention by way of example in connection with a spur gear.

As FIG. 10 indicates, the apparatus according to the present invention is also adapted by simple means to check the profiles of spur gears. In the particular example illustrated, the roller cylinder 25 idles on shaft 20. The feeler device 17 is supported by a bridge 92 which is connected to the transverse carriage 27. The axes 21 of the roller cylinder 25 and 3 of the receiving spindle 2 are adjusted so as to be in alignment with the workpiece 1 to be checked. The transmission ratio between the roller cylinder and the workpiece to be checked is so adjusted that the circumferential speed on the base circle of the workpiece to be checked equals the linear velocity of the measuring feeler, which means equals the velocity of the driving carriage 27. Thereupon, the feeler moves through the rated involute relative to the rotating workpiece to be checked.

The above explanations are limited to the essential features of the invention while the illustration of details such as connecting means, adjusting means, and the like, have been omitted, since they are well familiar to anybody skilled in the art and may be of any standard design.

It is, of course, to be understood that the present invention is not limited to the embodiments referred to above. Thus, the pivotable carriage, instead of carrying the workpiece to be checked, also could carry the feeler device. In such instance, the workpiece to be checked would be mounted stationary as is the case in the embodiments showing a shaft with the roller cylinder associated therewith.

It is furthermore to be understood that screw 12 must lock both of members 8 and 5 to base 10. The cylinder A behind the feeler 18 in FIG. 1 contains the bearing and inductive sensing means of the feeler. It should also be noted, that the rolling cylinder 25 is coupled to shaft 20 in the case of FIG. 1 by means not shown whereas it is freely rotatable on it in the case of FIG. 4.

What is claimed is:

1. In an apparatus for checking the profiles of gear teeth; a base member, a first support member mounted on said base member for pivotal movement thereon about a first axis, a second support member mounted on said first support member for movement thereon radial to said first axis, a third support member mounted on said second support member for movement thereon transverse to the direction of movement of said second support member, a first shaft rotatable in said second support member and having a first cylindrical portion, band means wrapped about said cylindrical portion and connected at one end to said cylindrical portion and at the other end to said third support member, a fourth support member on the opposite side of said first axis from said first support member and supported on said base member for movement therein in a direction at right angles to a radius from said first axis, a second shaft rotatable on said base member, a second cylindrical portion on said second shaft, band means wrapped about said second cylindrical portion and connected at one end to said second cylindrical portion and at the other end to said fourth support member, the line of intersection of the planes containing the axes of said first and second shafts being coaxial with said first axis, a lever pivoted on said first axis and having one arm engaging said third support member and another arm engaging said fourth support member, means for mounting a gear on said first shaft, a feeler, and means for mounting said feeler on one of said second shaft and second cylindrical portion and said fourth support member.

2. An apparatus according to claim 1, which includes means to lock said second support member in adjusted positions on said first support member.

3. An apparatus according to claim 2 which includes means to adjust the relative angularity of the two said arms of said lever and to lock said arms in adjusted positions of relative angularity.

4. An apparatus according to claim 3 in which each said arm has a pin and slot connection with its respective carriage, each slot extending radially to said first axis.

5. An apparatus according to claim 4 in which the slots are in the arms and the pins are carried by the respective support members and the said pin carried by said third support member is adjustable thereon in a direction at right angles to the direction of movement of said third support member on said second support member.

6. An apparatus according to claim 4 which includes screw threaded means connecting said fourth support member to said base member operable for adjusting the position of said fourth support member on said base member.

7. An apparatus according to claim 6 in which said feeler has a ball-like end for engagement with the flank of a tooth of a gear on said first shaft.

8. An apparatus according to claim 6 in which said feeler has a blade-like end for engagement with the flank of a tooth of a gear on said first shaft.

9. An apparatus according to claim 1 which includes means supporting said feeler on said second shaft in an eccentric position relative to the axis of said second shaft.

10. An apparatus acording to claim 6 which includes means to lock said second shaft against rotation on said base member and to release said second cylindrical portion to rotate on said second shaft, a frame fixed to said second cylindrical portion, a fifth support member slidable in said frame in a certain plane perpendicular to the axis of said second shaft, further band means wrapped about said second shaft and connected at one end to said second shaft and at the other end to said fifth support member, a sixth support member slidable on said fifth support member in a direction at right angles to the direction of movement of said fifth support member on said frame and parallel to said certain plane, said sixth support member having legs perpendicular to said certain plane, a resiliently extensible shaft having its ends slidable along said legs, and a stud fixed to the center of the shaft, a disc having a slot slidably receiving said stud, a rod connected to the disc and projecting radially therefrom and adapted to support said feeler at its outer end, a rocker to which said rod is fixed and tiltable about the axis of said extensible shaft, and means supporting said disc on said frame for angular adjustment of the disc on the frame about the axis of the disc.

11. An apparatus according to claim 6 which includes a flange on the end of said second cylindrical portion, a wheel rotatable on said flange, motor means for driving said wheel, an eccentric on said wheel, a frame radially slidable on said wheel and carrying said feeler, a roller on the frame bearing on said eccentric, and spring means urging the frame toward the eccentric.

12. An apparatus according to claim 11 in which said feeler is adjustable on said frame in a direction at right angles to the direction of movement of the frame on the wheel.

13. An apparatus according to claim 11 in which said wheel is a first friction disc and said motor drives a smaller second friction disc which engages said first friction disc.

14. An apparatus according to claim 6 which includes a flange on the end of said second cylindrical portion, a first wheel rotatable on the flange, a motor on the flange connected to the first wheel to drive the wheel in oscillation, a second and smaller wheel engaging the periphery of the first wheel so as to be driven thereby, an arm on said second wheel, and said feeler being mounted on said arm.

15. An apparatus according to claim 14 which includes an arm on said lever having a slot in which said second wheel is rotatable.

16. An apparatus according to claim 6 which includes a flange on the end of said second cylindrical portion, a wheel on said flange, frame means having a straight rail portion pressed against the periphery of said wheel, means adjustably mounting said feeler on said frame means, a motor mounted on said flange, and an eccentric driven by said motor and engaging said frame means to oscillate the frame means about the center of said wheel.

References Cited

UNITED STATES PATENTS 3,270,425   9/1966   Tishler et al.
3,321,840   5/1967   Pedersen.

SAMUEL S. MATTHEWS, Primary Examiner